US 8,495,981 B2

(12) United States Patent
Stewart et al.

(10) Patent No.: US 8,495,981 B2
(45) Date of Patent: Jul. 30, 2013

(54) SYSTEM AND METHOD FOR CAM PHASER CONTROL IN AN ENGINE

(75) Inventors: Etsuko Muraji Stewart, Laingsburg, MI (US); James R. Yurgil, Livonia, MI (US)

(73) Assignee: GM Global Technology Operations LLC

( * ) Notice: Subject to any disclaimer, the term of this patent is extended or adjusted under 35 U.S.C. 154(b) by 315 days.

(21) Appl. No.: 13/074,446

(22) Filed: Mar. 29, 2011

(65) Prior Publication Data
US 2012/0247411 A1    Oct. 4, 2012

(51) Int. Cl.
*F01L 1/04*      (2006.01)
*F02D 41/06*     (2006.01)

(52) U.S. Cl.
USPC ............. 123/179.4; 123/179.16; 123/179.18; 123/90.17

(58) Field of Classification Search
USPC .......... 123/90.11, 90.15–90.17, 179.3, 179.4, 123/179.14–179.16, 179.18; 701/112–113, 701/103
See application file for complete search history.

(56) References Cited

U.S. PATENT DOCUMENTS 6,915,767 B2 *   7/2005  Pfeiffer et al. ............. 123/90.15
2007/0169731 A1  7/2007  Farah et al.

OTHER PUBLICATIONS

U.S. Appl. No. 13/161,862, filed Jun. 16, 2011, Stewart et al.
U.S. Appl. No. 13/432,538, filed Mar. 28, 2012, Stewart et al.

* cited by examiner

*Primary Examiner* — Hai Huynh

(57) ABSTRACT

A control system for an engine includes a position determination module and a position control module. The position determination module determines a first cam phaser position for starting the engine prior to engine shut down, and determines a second cam phaser position for starting the engine while the engine is shut down. The position control module adjusts a cam phaser to the first cam phaser position at engine shut down. The position control module adjusts the cam phaser from the first cam phaser position to the second cam phaser at engine start up when a difference between the first cam phaser position and the second cam phaser position is greater than a predetermined difference. A method for controlling an engine is also provided.

20 Claims, 6 Drawing Sheets

SYSTEM AND METHOD FOR CAM PHASER CONTROL IN AN ENGINE

FIELD

The present disclosure relates to control systems and methods for engines, and more particularly, to systems and methods for cam phaser control during engine shut down and starting.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles typically include an internal combustion engine that combusts an air and fuel mixture in cylinders and thereby produces drive torque used to propel the vehicle. The engine may include pistons that reciprocate in the cylinders and that are coupled to a crankshaft. The pistons reciprocate in response to the combustion of the air and fuel mixture and thereby cause rotation of the crankshaft. The engine may further include a valve train that controls the flow of air into and out of the cylinders. The valve train may include a camshaft that selectively opens and closes intake valves and exhaust valves at the appropriate time and thereby controls the air flow. The camshaft may rotate with the crankshaft and thereby control the timing of the opening and closing relative to a position of the pistons within the cylinders. The valve train may further include a cam phaser coupled to the camshaft and the crankshaft. The cam phaser may adjust the rotational position of the camshaft with respect to the crankshaft and thereby adjust the timing of the opening and closing of the intake and exhaust valves relative to the position of the pistons.

Control systems have been developed to control engine operation, including engine shut down and starting. Stop-start engine control systems have been developed to increase fuel economy and reduce emissions. Stop-start systems selectively shut down and subsequently start the engine during periods of vehicle operation when drive torque from the engine is not required. For example, start-stop systems may shut down the engine as the vehicle slows to a stop when approaching a stop light. The start-stop systems may start the engine when a driver of the vehicle releases a brake pedal and/or depresses an accelerator pedal, indicating vehicle acceleration is desired. Accordingly, start-stop systems may frequently shut down and start the engine during vehicle operation based on inputs from the driver and/or various operating conditions, such as vehicle speed and engine speed.

SUMMARY

In one form, the present disclosure provides a control system for an engine including a position determination module and a position control module. The position determination module determines a first cam phaser position for starting the engine prior to engine shut down, and determines a second cam phaser position for starting the engine while the engine is shut down. The position control module adjusts a cam phaser to the first cam phaser position at engine shut down. The position control module adjusts the cam phaser from the first cam phaser position to the second cam phaser at engine start up when a difference between the first cam phaser position and the second cam phaser position is greater than a predetermined difference.

In one feature, the position determination module determines the first cam phaser position based on an engine operating condition prior to engine shut down. In a related feature, the position determination module selects one of manifold absolute pressure and ambient pressure as the operating condition based on an engine shut-down criterion. In another related feature, the position determination module selects ambient pressure as the operating condition when the engine is shut down in response to a driver input, and selects manifold absolute pressure as the operating condition when the engine is shut down in response to an engine torque being less than a predetermined torque. In still another related feature, the position determination module selects ambient pressure as the operating condition when an ignition switch has moved from an ON position to an OFF position.

In other features, the position determination module determines the first cam phaser position based on at least one of an engine temperature, a manifold absolute pressure, and an ambient pressure prior to engine shut down. In still other features, the first cam phaser position is a position other than a fully advanced position and a fully retarded position. In yet other features, the position control module adjusts the cam phaser to the first cam phaser position prior to when an engine speed at engine shut down is zero and adjusts the cam phaser to the second cam phaser prior to engine cranking at engine start up. In further features, the cam phaser is electrically actuated.

The present disclosure also provides a control system for an engine including a start-stop module, a position determination module, and a position control module. The start-stop module shuts down the engine during a first period and subsequently starts the engine after a second period. The position determination module determines a first cam phaser position based on a first engine operating condition during the first period. The position determination module further determines a second cam phaser position based on a second engine operating condition during the second period. The position control module adjusts a cam phaser to the first cam phaser position during the first period. The position control module selectively adjusts the cam phaser from the first cam phaser position to the second cam phaser position based on a difference between the first and second cam phaser positions.

In one feature, the position control module adjusts the cam phaser to the second cam phaser position when the difference is greater than a predetermined difference. In another feature, the position control module adjusts the cam phaser to the first cam phaser position prior to when the start-stop module shuts down the engine. In still another feature, the position control module adjusts the cam phaser to the second cam phaser position during the second period.

In another form, the present disclosure provides a method for controlling an engine. The method includes determining a first cam phaser position for starting the engine prior to engine shut down, and determining a second cam phaser position for starting the engine while the engine is shut down. The method further includes adjusting a cam phaser to the first cam phaser position at engine shut down. The method further includes adjusting the cam phaser from the first cam phaser position to the second cam phaser at engine start up when a difference between the first cam phaser position and the second cam phaser position is greater than a predetermined difference.

In one feature, the method further includes determining the first cam phaser position based on an engine operating condition prior to engine shut down. In another feature, the method further includes selecting one of manifold absolute pressure and ambient pressure as the operating condition based on an engine shut-down criterion. In still another feature, the method further includes selecting ambient pressure as the operating condition when the engine is shut down in response to a driver input. In a related feature, the method further includes selecting manifold absolute pressure as the operating condition when the engine is shut down in response to an engine torque being less than a predetermined torque. In yet another feature, the method further includes determining the first cam phaser position based on at least one of an engine temperature, a manifold absolute pressure, and an ambient pressure prior to engine shut down. In various other features, the first cam phaser position is a position other than a fully advanced position and a fully retarded position.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
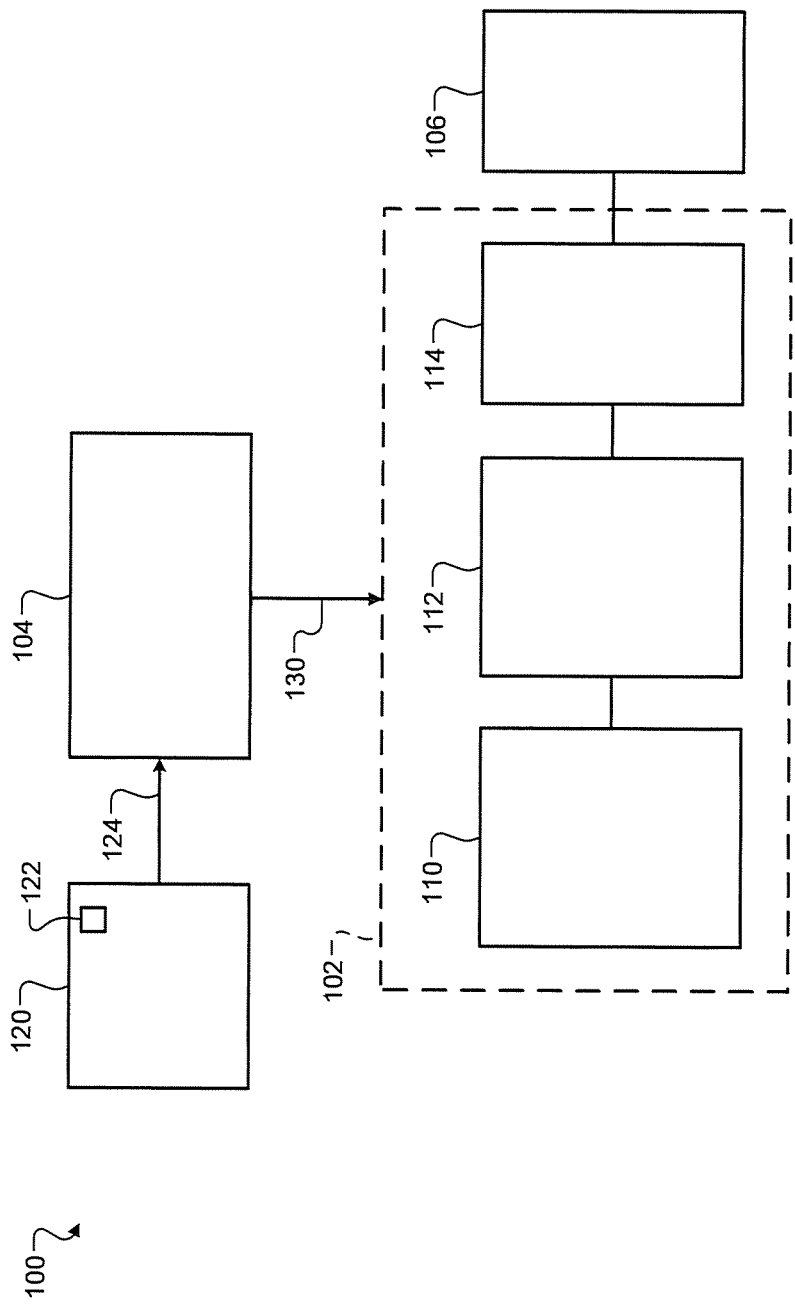
FIG. 1 is a functional block diagram illustrating an exemplary vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Cam phasers are typically hydraulically actuated using pressurized oil produced within the engine, for example, by an oil pump driven by the engine. In some engine systems, pressurized oil may not be available during periods when the engine is not running (i.e., is shut down). A biasing member may bias a cam phaser in one of a fully retarded and a fully advanced position during periods when pressurized oil is not available. When the engine is started, the cam phaser may be in the fully retarded or fully advanced position and may remain there until sufficient oil pressure is available to adjust the position of the cam phaser to a desired position. Thus, there may be an undesirable delay in moving the cam phaser to an optimal position, resulting in reduced engine performance. For example, the delay may increase a period required to start the engine. In automatic start-stop situations, the delay may result in objectionable engine starting periods. As used herein, optimal cam phaser position generally refers to a desirable or suitable cam phaser position for achieving the desired engine performance.

The control system and method of the present disclosure utilizes an electrically-actuated cam phaser that can be parked at various positions between fully retarded and fully advanced positions during periods when the engine is shut down. A phaser control module estimates an optimal position of the cam phaser at engine startup based on engine operating conditions prior to engine shut down. The phaser control module then moves the cam phaser to the estimated position prior to or during engine shut down. In this way, the phaser control module may park the cam phaser at engine shut down at or near the optimal position for engine starting. Just prior to engine start up, the phaser control module determines an optimal position based on the current operating conditions. The phaser control module then moves the cam phaser to the optimal position when a difference between the optimal position and the estimated position is greater than a predetermined difference. The phaser control module may move the cam phaser prior to engine cranking to avoid increasing the electrical load to the vehicle electric system during cranking.

By estimating the optimal position and moving the cam phaser to the estimated position at engine shut down, the cam phaser can be parked in a position at or near an optimal position at start up. In particular, when engine off time is relatively short, such as in automatic start-stop situations, the engine operating conditions used to estimate the optimal position may remain relatively constant and the cam phaser will be parked at or near the optimal position for starting the engine. Parking the cam phaser at or near the optimal position prior to engine shut down can improve engine startability, fuel economy, and emissions.

With particular reference to FIG. 1, a functional block diagram illustrating an exemplary vehicle system 100 according to the present disclosure is presented. The vehicle system 100 includes a powertrain 102 controlled by a powertrain control module 104. The powertrain 102 produces drive torque used to drive one or more wheels 106 of the vehicle and includes an engine system 110, a transmission 112, and a driveline 114. The engine system 110 produces drive torque that is transmitted through the transmission 112 at one or more gear ratios to the wheels 106 via the driveline 114. The present disclosure is not limited to transmissions or drivelines of a particular type. For example, the transmission 112 may be an automatic transmission or a manual transmission. Additionally, the present disclosure is not limited to powertrains of a particular layout. For example, the powertrain 102 may have a front-wheel-drive layout, a rear-wheel-drive layout, or an all-wheel drive layout.

The powertrain control module 104 controls operation of the powertrain 102 based on various driver inputs, vehicle operating conditions, and other vehicle system signals. The driver inputs are received by driver interface modules 120 that generate driver signals in response to the driver inputs. The driver interface modules 120 may include an ignition switch 122 manipulated by the driver to start and shut down the vehicle. The ignition switch 122 may have multiple positions, for example, an OFF position, an ON position, and a CRANK position. The ignition switch 122 may output an ignition signal 124 indicative of the ignition switch position. The driver interface modules 120 may further include, for example, an accelerator pedal (not shown) and a brake pedal (not shown) manipulated by the driver that generate an accelerator pedal position signal and a brake pedal position signal, respectively. Various vehicle operating conditions and parameters are measured by sensors and/or determined by modules as discussed in further detail below. The vehicle system signals include the driver signals and other signals 130 generated by the various components of the vehicle system 100.

Figure 2:
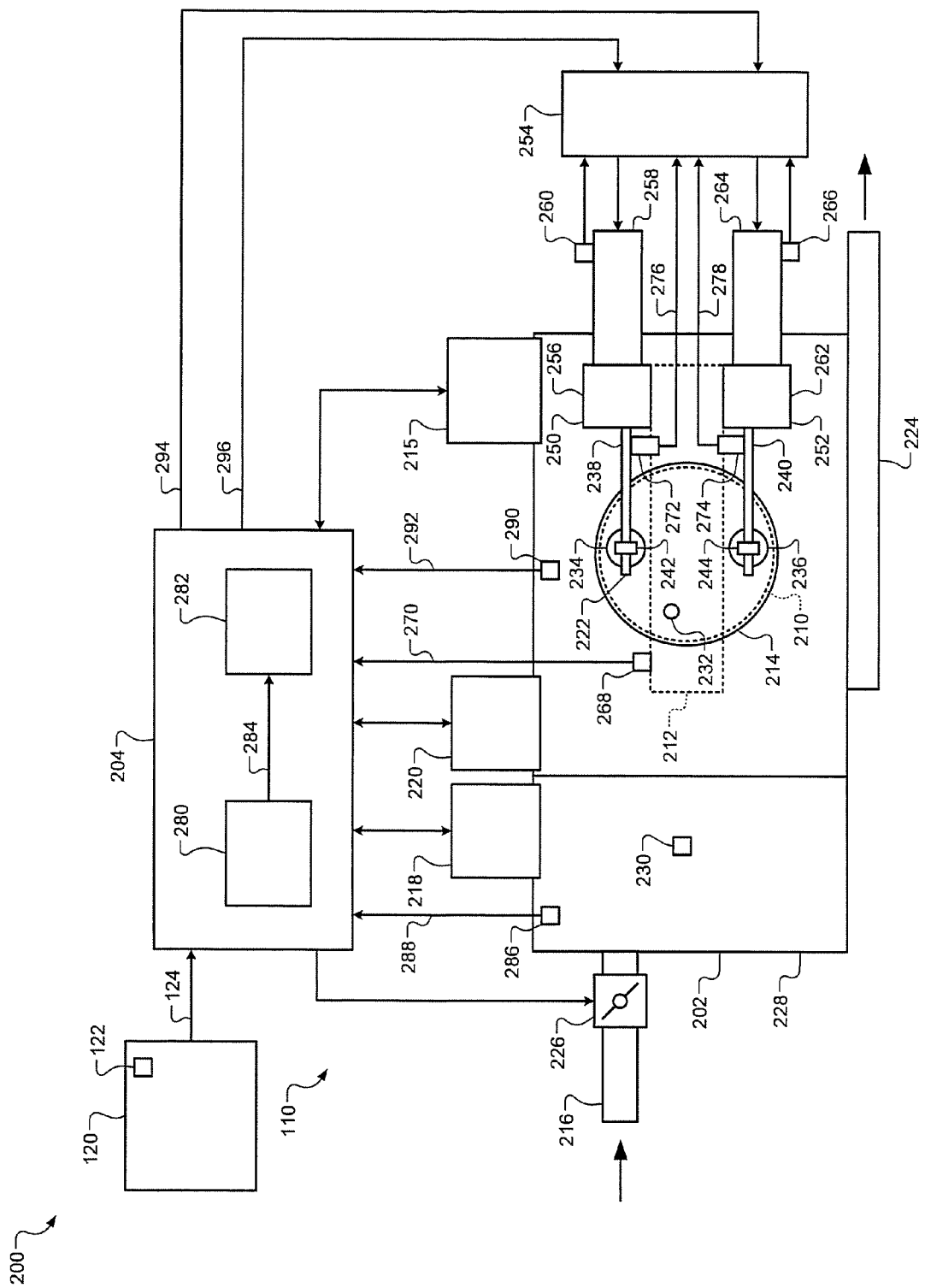
FIG. 2 is a functional block diagram illustrating an exemplary engine control system according to the present disclosure.

With particular reference to FIG. 2, a functional block diagram illustrating an exemplary implementation of the engine system 110 in an engine control system 200 according to the present disclosure is presented. Generally, the engine system 110 includes an internal combustion engine (ICE) 202 controlled by an engine control module (ECM) 204 based on various driver inputs, engine operating conditions, and other vehicle system signals. The engine system 110 includes a start-stop system that selectively shuts down and starts the ICE 202 during periods of vehicle operation as discussed in more detail below.

The ICE 202 produces drive torque by combusting an air-fuel (AF) mixture and may be one of several types. For example, the ICE 202 may be a spark-ignition (SI) engine or a compression-ignition (CI) engine. The ICE 202 may have a V-type configuration or an in-line configuration. For exemplary purposes, the ICE 202 is presented as a reciprocating SI engine including a single piston 210 coupled to a crankshaft 212. The ICE 202 is presented as a single cylinder engine for simplicity, however, it will be appreciated from the following discussion that the present disclosure applies equally to engines having multiple cylinders. The piston 210 reciprocates within a cylinder 214 between a top-dead-center (TDC) position and a bottom-dead-center (BDC) position. In the TDC position, a volume of the cylinder 214 is at a minimum. In the BDC position, the volume of the cylinder 214 is at a maximum.

The ICE 202 includes a starting system 215, an intake system 216, a fuel system 218, an ignition system 220, a valve train 222, and an exhaust system 224. The starting system 215 supplies input torque for starting the ICE 202 and may be one of various types. In various implementations, the starting system 215 may include an electric starter (not shown) drivingly coupled to the crankshaft 212 via a flywheel. Alternately or additionally, the starting system 215 may include an electric motor generator (not shown) drivingly coupled to the crankshaft 212 via a belt. The intake system 216 controls a mass air flow (MAF) of air entering the ICE 202 and distributes the air to the cylinder 214 via intake ports (not shown).

The intake system 216 may include a throttle 226 that controls MAF and an intake manifold 228 that distributes the air to the cylinder 214. The throttle 226 may include a butterfly valve having a rotatable blade. The fuel system 218 supplies fuel to the ICE 202 and may include a fuel tank assembly (not shown) that contains the fuel and one or more fuel injectors that control an amount of the fuel supplied. In various implementations, such as central point injection and multi-point injection implementations, the fuel injectors may inject fuel into the intake system 216 upstream of the cylinder 214. In alternate direct-injection implementations, the fuel injectors may inject fuel directly into the cylinder 214. For exemplary purposes, a single fuel injector 230 extending within the intake manifold 228 is presented. The ignition system 220 supplies energy for initiating combustion within the cylinder 214 in the form of a spark supplied by a spark plug 232 extending within the cylinder 214. In alternate implementations, such as CI engine implementations, the spark plug 232 may be omitted and combustion may be initiated by compression of the A/F mixture.

The valve train 222 controls the timing and amount of intake air entering the cylinder 214, including fuel mixed with the intake air. The valve train 222 includes at least one intake valve and one exhaust valve actuated by a camshaft and may have one of several configurations, for example, an overhead camshaft or a cam-in-block configuration. For exemplary purposes, the valve train 222 presented has an overhead camshaft configuration including an intake valve 234 and an exhaust valve 236 actuated by a first camshaft 238 and a second camshaft 240, respectively. The intake valve 234 is disposed within an intake port (not shown) and extends within the cylinder 214. In an open position, the intake valve 234 allows air and fuel to enter the cylinder 214 via the intake system 216. In a closed position, the intake valve 234 closes the cylinder 214 to the intake system 216. The exhaust valve 236 is disposed within an exhaust port (not shown) and extends within the cylinder 214. In an open position, the exhaust valve 236 allows combustion gases to exit the cylinder 214 to the exhaust system 224. In a closed position, the exhaust valve 236 closes the cylinder 214 to the exhaust system 224. In various implementations, multiple intake valves and/or exhaust valves may be provided for each cylinder of the ICE 202.

The first camshaft 238 and the second camshaft 240 are coupled to and rotate with the crankshaft 212. The first camshaft 238 and the second camshaft 240 may be coupled to the crankshaft 212 via a chain or belt and, in this manner, rotation of the first camshaft 238 and the second camshaft 240 may be synchronized with rotation of the crankshaft 212. The first camshaft 238 controls the opening and closing of the intake valve 234 relative to the TDC and BDC positions (i.e., intake valve timing) and includes a lobe 242 that engages the intake valve 234. The second camshaft 240 controls the opening and closing of the exhaust valve 236 relative to the TDC and BDC positions (i.e., exhaust valve timing) and includes a lobe 244 that engages the exhaust valve 236. As the first and second camshafts 238, 240 rotate, the lobes 242, 244 displace the respective intake and exhaust valves 234, 236 between the open and closed positions.

According to the present disclosure, the valve train 222 further includes a cam phaser system that further controls intake and/or exhaust valve timing by controlling a phase angle between the first and/or second camshafts 238, 240 and the crankshaft 212. The phaser system presented includes an intake phaser 250, an exhaust phaser 252, and a motor driver module 254. The intake phaser 250 further controls intake valve timing by selectively adjusting the rotational position of the first camshaft 238 relative to the crankshaft 212, or what may be referred to as intake phase angle. The intake phaser 250 includes a gear train 256, an electric motor 258, and a position sensor 260. The gear train 256 includes a drive gear (not shown) in a meshed arrangement with a driven gear (not shown). The drive gear is coupled to the crankshaft 212 and the driven gear is coupled to the first camshaft 238. In various arrangements, one or more intermediate gears may be interposed between the drive gear and the driven gear.

The electric motor 258 is drivingly coupled to the gear train 256. Rotation of the electric motor 258 in a first rotational direction advances the intake phase angle between the first camshaft 238 and the crankshaft 212. Rotation of the electric motor 258 in a second rotational direction retards the intake phase angle between the first camshaft 238 and the crankshaft 212. The gear train 256 and the electric motor 258 cooperate to hold the phase angle during periods when the electric motor 258 is not rotating, for example, when the electric motor 258 is not powered. The position sensor 260 senses a rotational position of the electric motor 258 and outputs a signal indicative of the rotational position sensed.

The exhaust phaser 252 further controls exhaust valve timing by selectively adjusting the rotational position of the second camshaft 240 relative to the crankshaft 212, or what may be referred to as exhaust phase angle. The exhaust phaser 252 is structurally and functionally similar to the intake phaser 250. The exhaust phaser 252 includes a gear train 262, an electric motor 264, and a position sensor 266 substantially similar to the gear train 256, the electric motor 258, and the position sensor 260 discussed above.

The motor driver module 254 controls the intake phaser position and the exhaust phaser position (collectively, cam phaser positions) based on various inputs. The inputs include various control values received from the ECM 204, including intake and exhaust phaser position control values (collectively, cam phaser position control values). In response to the timed control values, the motor driver module 254 adjusts the intake and exhaust phaser positions to the commanded intake and exhaust phaser positions. The motor driver module 254 adjusts the intake and exhaust phaser positions by controlling operation of the electric motors 258, 264. The motor driver module 254 may measure the current intake and exhaust phase angles to determine which rotational direction to operate the electric motors 258, 264 to advance or retard the intake and exhaust phasers 250, 252 to meet the commanded positions.

For example, a crankshaft position sensor 268 may sense a rotational position of the crankshaft 212 and output a crankshaft position signal (CPS) 270 indicative of the crankshaft rotational position sensed. Camshaft sensors 272, 274 may sense rotational positions of the first and second camshafts 238, 240, respectively. The camshaft sensors 272, 274 output camshaft position signals 276, 278, respectively, indicative of the intake and exhaust camshaft rotational positions sensed. The motor driver module 254 may determine the current intake and exhaust phaser angles based on the signals 270, 276, 278. When making adjustments, the motor driver module 254 may control operation of the electric motors 258, 264, based on the outputs of the position sensors 260, 266. In this way, the intake and exhaust phasers 250, 252 may be adjusted to desired cam phaser positions at the appropriate time.

During operation of the ICE 202, intake air is drawn into the cylinder 214 through the throttle 226, the intake manifold 228, and the intake valve 234 by the piston 210 and mixes with fuel supplied by the fuel injector 230. The A/F mixture is compressed by the piston 210 and subsequently ignited by the spark plug 232. Combustion of the A/F mixture drives the piston 210, which in turn drives the crankshaft 212 and thereby produces the drive torque. Exhaust produced by the combustion is forced out of the cylinder 214 by the piston through the exhaust valve 236 and enters into the exhaust system 224.

The ECM 204 controls operation of the ICE 202 and, more specifically, engine torque output by controlling various engine operating parameters including MAF, A/F ratio, spark timing, and valve timing. The ECM 204 presented implements cam phaser control according to the present disclosure. The ECM 204 controls operation by outputting various control values in control signals, which may be timed control signals synchronized with crankshaft rotational position. The ECM 204 may output timed control signals based on the CPS signal 270 output by the crankshaft position sensor 268.

According to the present disclosure, the ECM 204 includes a start-stop module 280 and a phaser control module 282. The start-stop module 280 monitors various vehicle system signals and operating parameters and selectively shuts down and starts the ICE 202 in a controlled manner based on various criteria. In an exemplary implementation, the criteria include driver-initiated shut-down and starting criteria and automatic shut-down and starting criteria. The driver-initiated shut-down and starting criteria include whether the driver has moved the ignition switch 122 between its various positions. The start-stop module 280 initiates a driver-initiated shut-down process in response to the driver manipulating the ignition switch 122 from an ON position to an OFF position. The start-stop module 280 initiates a driver-initiated starting process in response to the driver manipulating the ignition switch 122 from an OFF position to an ON position.

The automatic shut-down and starting criteria include whether engine torque is required. The start-stop module 280 selectively shuts down the ICE 202 during vehicle operating periods when engine torque output is not required. The start-stop module 280 may periodically determine whether engine torque is required based on various operating parameters, such as vehicle speed, engine speed, accelerator pedal position, and brake pedal position. The start-stop module 280 initiates an automatic shut-down process when a desired engine torque output is less than or equal to a predetermined torque. The start-stop module 280 subsequently initiates an automatic starting process when the desired engine torque output is greater than the predetermined torque.

The start-stop module 280 outputs a start-stop signal 284 informing the phaser control module 282 which criteria for shutting down or starting the ICE 202 have been met. The start-stop module 280 waits a first period before shutting the ICE 202 down to allow the phaser control module 282 to adjust the cam phaser positions to desired positions for starting the ICE 202. The start-stop module 280 waits a second period before starting the ICE 202 to allow the phaser control module 282 to selectively adjust the cam phaser positions, as discussed in more detail below.

The phaser control module 282 monitors various vehicle system signals and operating parameters and controls the cam phaser positions. In an exemplary implementation, the engine operating parameters include manifold absolute pressure (MAP), engine temperature, and ambient or barometric pressure. A MAP sensor 286 extending within the intake manifold 228 may sense MAP and output a MAP signal 288 indicative of the MAP sensed. The engine temperature may be estimated based on a temperature of coolant flowing through a cooling system of the ICE 202. A coolant temperature sensor 290 extending within the cooling system may sense a coolant temperature and output a coolant temperature (CTS) signal 292 indicative of the coolant temperature sensed. The phaser control module 282 controls the cam phaser positions by outputting intake and exhaust phaser position control values to the motor driver module 254 in timed control signals 294 and 296, respectively.

Figure 3:
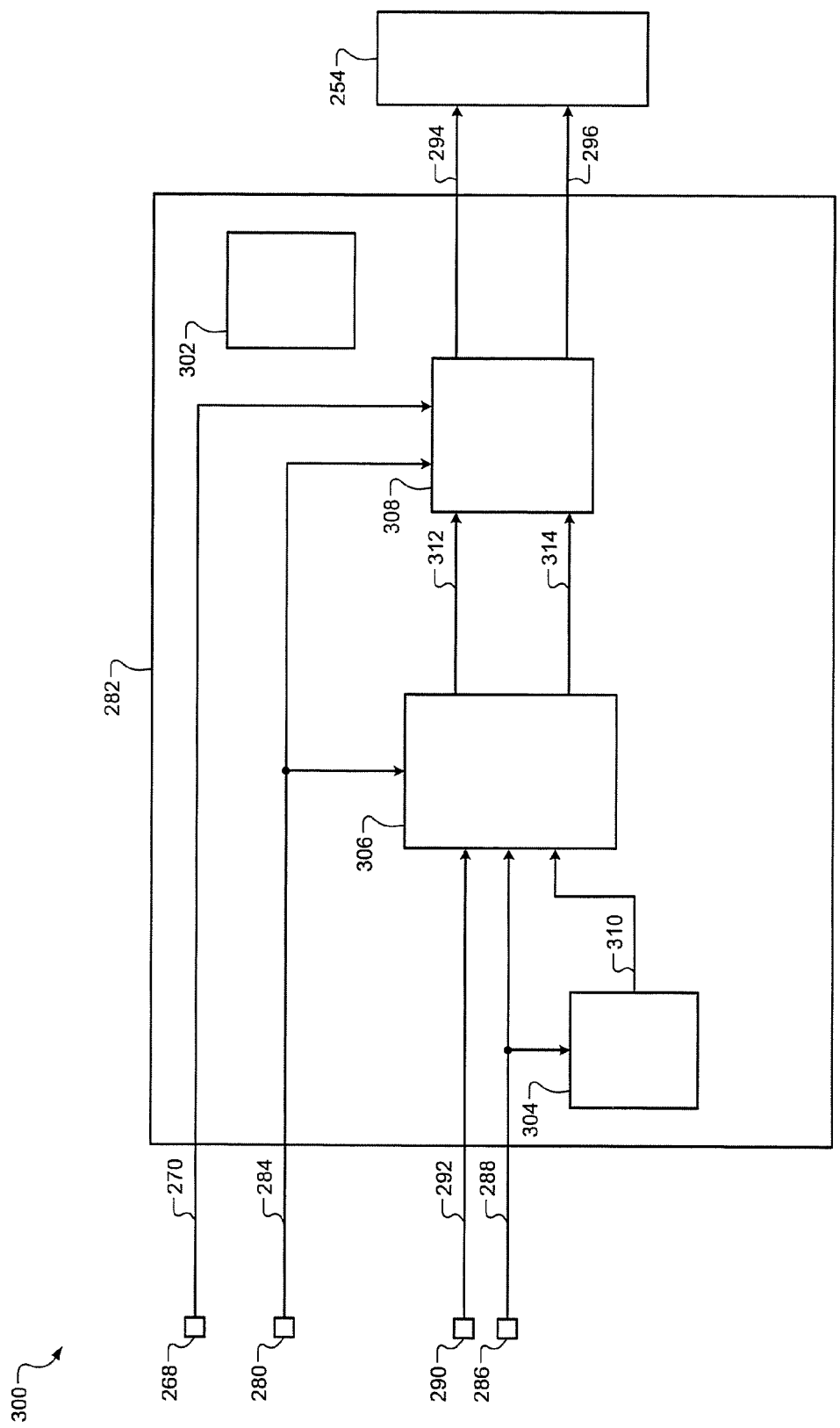
FIG. 3 is a functional block diagram illustrating an exemplary phaser control system according to the present disclosure.

With particular reference to FIG. 3, a functional block diagram illustrating an exemplary implementation of the phaser control module 282 in a phaser control system 300 according to the present disclosure is presented. The phaser control module 282 includes a memory module 302, an ambient pressure module 304, a position determination module 306, and a position control module 308. The memory module 302 includes nonvolatile memory where various control values used by the phaser control system 300 are stored for retrieval. The ambient pressure module 304 periodically determines a current ambient pressure and outputs the current ambient pressure in an ambient pressure signal 310. The ambient pressure may be determined according to various methods based on various operating parameters. For example, the ambient pressure may be determined based on MAP during periods when the ICE 202 is not running. Accordingly, the ambient pressure module 304 may receive the MAP signal 288 and determine the ambient pressure based on the MAP indicated during various engine shut-down periods.

The position determination module 306 monitors the start-stop signal 284 and periodically determines a desired intake phaser position and a desired exhaust phaser position (collectively, desired cam phaser positions) based on various vehicle operating parameters and vehicle system signals. According to the present example, the position determination module 306 receives the MAP signal 288, the CTS signal 292, and the ambient pressure signal 310. The position determination module 306 outputs the desired intake phaser position in an intake position signal 312 and the desired exhaust phaser position in an exhaust position signal 314. Generally, during periods the ICE 202 is running, the position determination module 306 outputs desired cam phaser positions for achieving the desired engine operation, for example, a desired engine torque output.

When the start-stop module 280 informs the position determination module 306 that the ICE 202 will be shut down, the position determination module 306 estimates optimal cam phaser positions for starting the ICE 202 after the ICE 202 is shut down. The position determination module 306 outputs the estimated optimal cam phaser positions as the desired cam phaser positions. More specifically, when the start-stop signal 284 indicates the driver-initiated criteria have been met, the position determination module 306 determines the optimal intake and exhaust phaser positions using a first look-up table. The estimated optimal intake phaser position (ICPP1) and the estimated optimal exhaust phaser position (ECPP1) are retrieved from the first look-up table based on the current engine temperature and the current atmospheric pressure. The first look-up table is stored in the memory module 302 and includes predetermined cam phaser positions corresponding to expected optimal cam phaser positions after a prolonged engine shut-down period. The cam phaser positions can be predetermined, for example, during a calibration phase of vehicle design, for various expected vehicle shut-down periods. In alternate implementations, the optimal intake and exhaust phaser positions can be estimated using a predetermined equation based on the current engine temperature and the current atmospheric pressure.

When the start-stop signal indicates the automatic start-stop criteria have been met, the position determination module 306 determines the optimal intake and exhaust phaser positions from a second look-up table. The estimated optimal cam phaser positions, ICPP1 and ECPP1, are retrieved from the second look-up table based on the current engine temperature and the current MAP. The second look-up table is stored in the memory module 302 and includes predetermined cam phaser positions corresponding to optimal cam phaser positions after a relatively brief engine shutdown period. The desired intake and exhaust phaser positions can be predetermined, for example, during a calibration phase of vehicle design, for various expected automatic engine shut-down periods. In alternate implementations, the optimal cam phaser positions can be estimated from a predetermined equation based on the current engine temperature and the current MAP.

Subsequently, when the start-stop module 280 informs the position determination module 306 that the ICE 202 will be started, the position determination module 306 re-determines the optimal cam phaser positions for starting the ICE 202 based on the current engine operating conditions. The position determination module 306 determines new optimal cam phaser positions using a third look-up table. The new optimal intake phaser position (ICPP2) and the new optimal exhaust phaser position (ECPP2) may be retrieved from the third look-up table based on various operating parameters including, for example, engine coolant temperature and MAP. The third look-up table is stored in the memory module 302 and includes predetermined cam phaser positions for achieving a desired engine startup, for example, a desired engine cranking period. In various implementations, the position determination module 306 may begin periodically re-determining the optimal cam phaser positions during a period beginning after engine shutdown and before the start-stop module 280 determines the engine starting criteria have been met. In this way, the intake and exhaust cam phaser positions may be selectively adjusted or updated during the period between engine shutdown and engine startup.

The position control module 308 receives the start-stop signal 284, the intake position signal 312, and the exhaust position signal 314, and controls the cam phaser positions via the timed control signals 294, 296. Based on the foregoing signals, the position control module 308 adjusts the cam phaser positions to the desired cam phaser positions at engine shut down and at engine startup. More specifically, when the engine shut-down criteria are met, the position control module 308 outputs position control values to adjust the intake and exhaust phaser positions to the respective estimated optimal cam phaser positions, ICPP1 and ECPP1. In various implementations, the position control module 308 adjusts the cam phaser positions to the ICPP1 and ECPP1 positions during the first period prior when the ICE 202 is shut down. During the engine shut-down process, the position control module 308 outputs position control values to maintain the intake and exhaust phasers 250, 252 in the estimated optimal cam phaser positions, ICPP1 and ECPP1. In alternate implementations, the position control module 308 adjusts the cam phaser positions to the ICPP1 and ECPP1 positions during the engine shutdown process.

After engine shut down, when the engine starting criteria are met, the position control module 308 selectively adjusts the intake and exhaust phasers 250, 252 to the new optimal cam phaser positions, ICPP2 and ECPP2. The position control module 308 adjusts the intake phaser 250 from the ICPP1 position to the ICPP2 position when a difference between the ICPP1 and ICPP2 positions is greater than a first predetermined difference. The position control module 308 adjusts the exhaust phaser 252 from the ECPP1 position to the ECPP2 position when a difference between the ECPP1 and ECPP2 positions is greater than a second predetermined difference. The position control module 308 may adjust the intake and exhaust phasers 250, 252 to the ICPP2 and ECPP2 positions during the second period prior to starting the ICE 202 or, alternately, during a period of the engine starting process. By making the adjustments during the second period, an additional electrical load by the electric motors 258, 264 to the vehicle electrical system during the engine starting process can be avoided. In various implementations, the position control module 308 may selectively adjust the intake and exhaust phaser positions prior to when the engine starting criteria are met. For example, the position control module 308 may selectively adjust the intake and exhaust phaser positions based on new estimated optimal phaser positions determined after engine shutdown and before the engine starting criteria are met.

Figure 4:
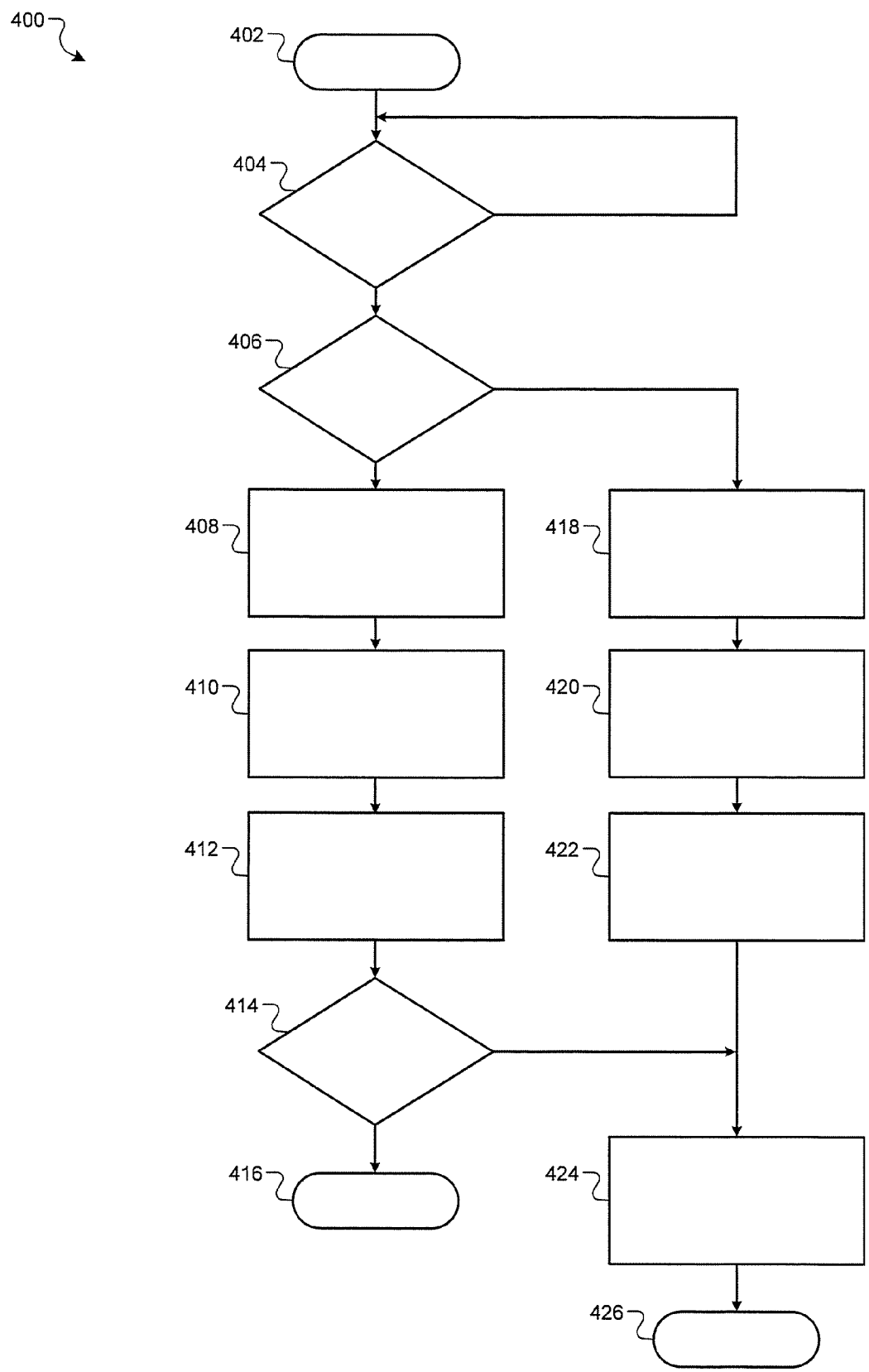
FIGS. 4-6 are flow diagrams illustrating an exemplary method for phaser control according to the present disclosure.
Figure 5:
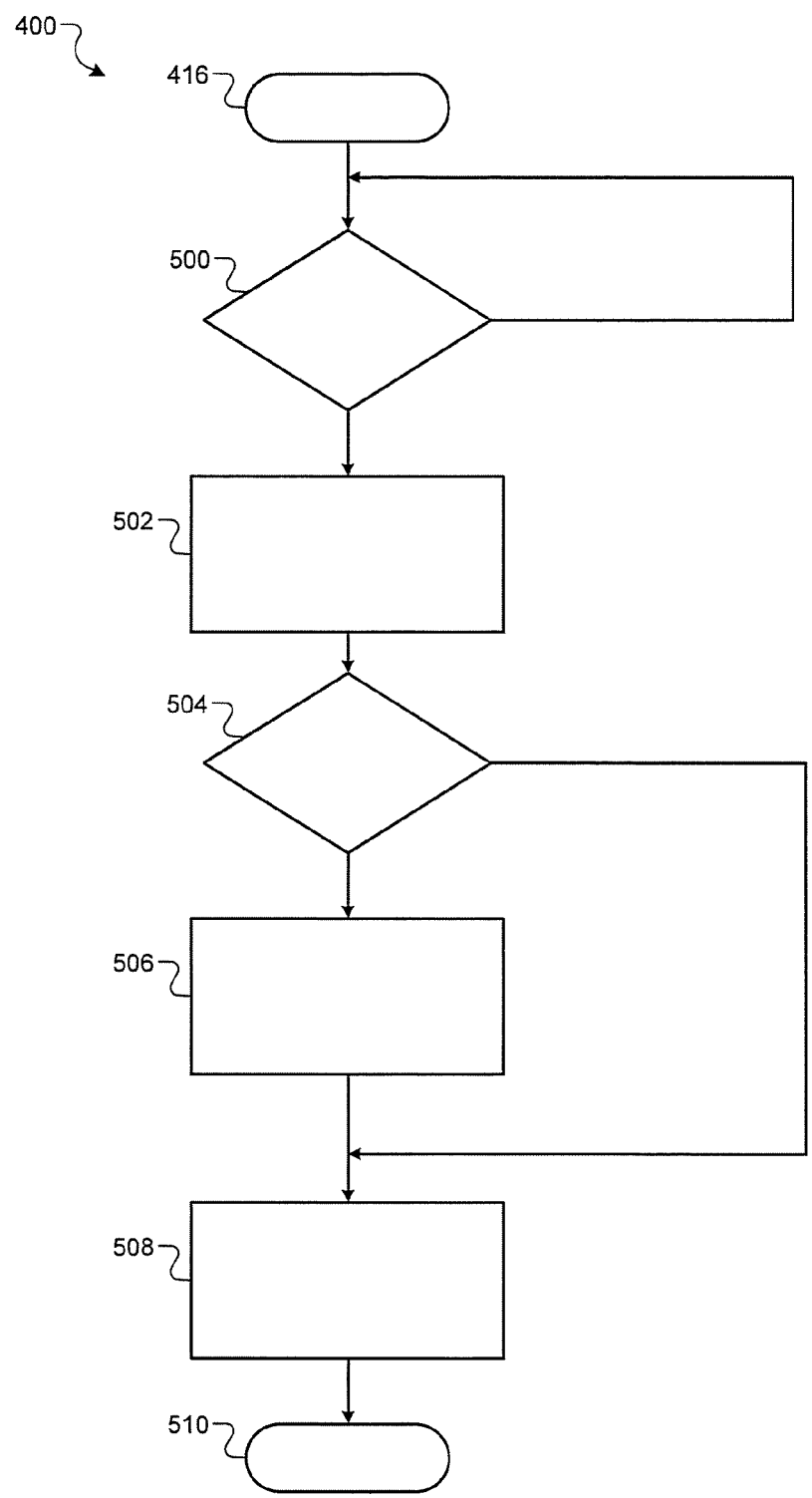
Figure 6:
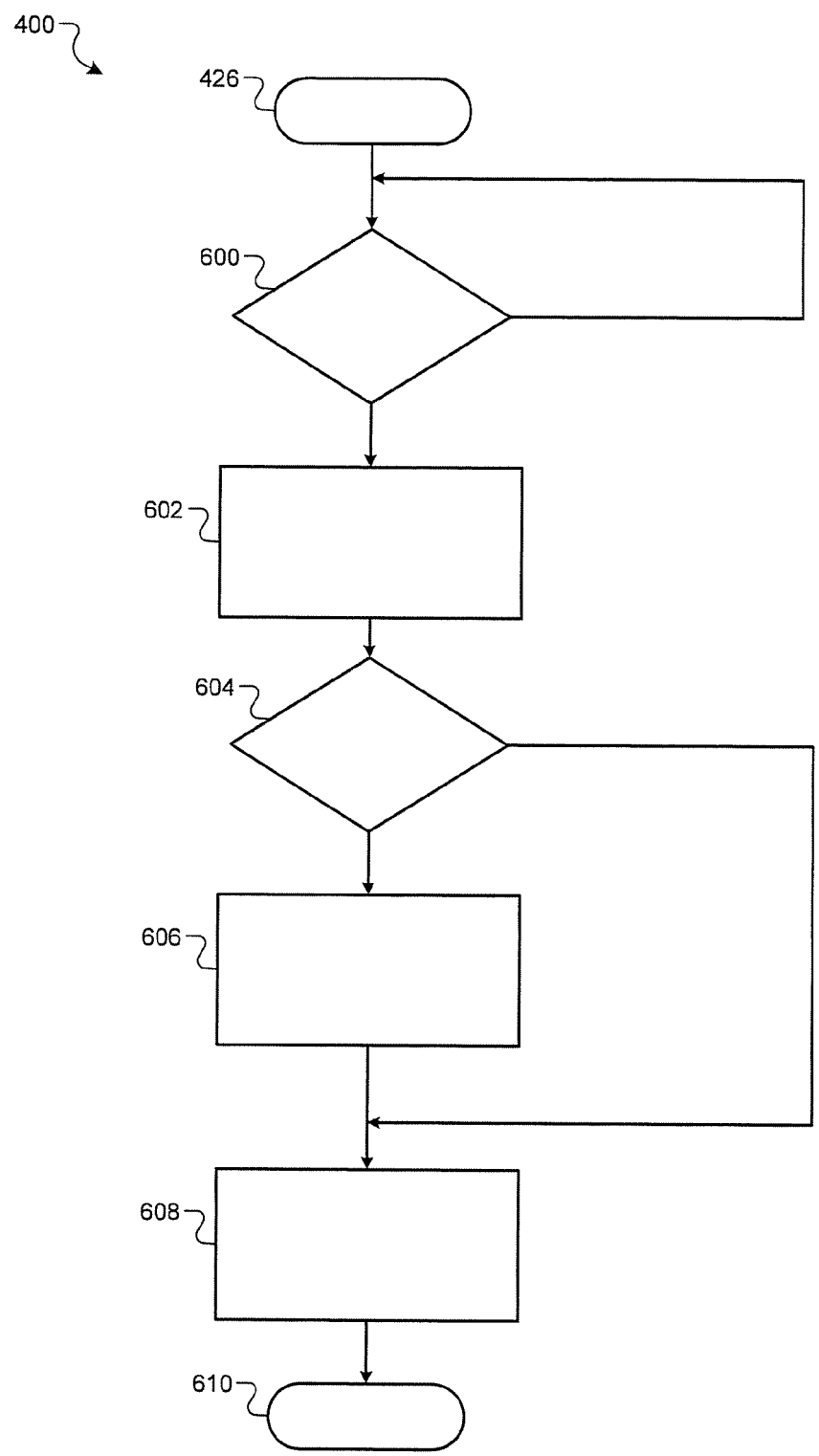

With particular reference to FIGS. 4-6, a flow diagram illustrating an exemplary method 400 for controlling cam phasers of an engine according to the present disclosure is presented. The method 400 can be implemented in one or more modules of a phaser control system, such as the phaser control system 300 discussed above. For simplicity, the method 400 will be described with reference to the various components of the phaser control system 300, as appropriate. In this way, operation of the phaser control system 300 may be more fully described and understood.

With particular reference to FIG. 4, a start of the method 400 is designated at 402. At 404, the start-stop module 280 determines whether to shut down the ICE 202 based on the automatic and driver-initiated shut-down criteria. If yes, the start-stop module 280 informs the phaser control module 282 that the ICE 202 will be shut down via the start-stop signal 284 and control continues at 406. At 406, the phaser control module 282 determines whether the automatic shut-down criteria have been met from the start-stop signal 284. If yes, then control continues at 408-414, otherwise, control continues at 418-424. At 408, the position determination module 306 retrieves the estimated optimal cam phaser positions, ICPP1 and ECPP1, from the second look-up table based on the current engine temperature and the current MAP.

At 410, the position control module 308 adjusts the intake and exhaust phasers 250, 252 to the estimated optimal cam phaser positions, ICPP1 and ECPP1, determined at 408 by outputting the appropriate control values to the motor driver module 254. At 412, the start-stop module 280 shuts down the ICE 202. In various implementations, engine shutdown may occur while the intake and exhaust phasers 250, 252 are moving to the estimated optimal cam phaser positions, ICPP1 and ECPP1. At 414, the start-stop module 280 determines whether to continue to automatic engine start. If yes, then control continues at 500 (FIG. 5) as designated at 416, otherwise, control continues at 420. Control continues to automatic engine start when there is no overriding reason to shut down the ICE 202. For example, control continues to automatic engine start when the driver has not initiated engine shut down by moving the ignition switch 122 to the OFF position.

At 418, the position control module 308 retrieves the estimated optimal cam phaser positions, ICPP1 and ECPP1, from the first look-up table based on the current engine coolant temperature and the current ambient pressure. At 420, the position control module 308 adjusts the intake and exhaust phasers 250, 252 to the respective estimated optimal cam phaser positions, ICPP1 and ECPP1, determined at 418 by outputting the appropriate control values to the motor driver module 254. At 422, the start-stop module 280 shuts down the ICE 202. In various implementations, engine shutdown may occur while the intake and exhaust phasers 250, 252 are moving to the estimated optimal cam phaser positions, ICPP1 and ECPP1. At 424, the ECM 204 shuts down the vehicle. From 424, control continues at 600 (FIG. 6) as designated by reference numeral 426.

With particular reference to FIG. 5, control may continue at 500 from 414 as indicated by reference numeral 416. At 500, the start-stop module 280 determines whether to start the ICE 202 based on the automatic starting criteria. If yes, then control proceeds at 502, otherwise, control loops back as shown. At 502, the position determination module 306 determines the new optimal intake and exhaust phaser positions, ICPP2 and ECPP2, based on the current engine operating conditions. At 504, the position control module 308 determines a first difference between ICPP1 and ICPP2 and a second difference between ECPP1 and ECPP2. The position control module 308 then determines whether the first difference is greater than a first predetermined difference. If yes, then control of the intake phaser 250 continues at 506, otherwise, control of the intake phaser 250 continues at 508. The position control module 308 further determines whether the second difference is greater than a second predetermined difference. If yes, then control of the exhaust phaser 252 continues at 506, otherwise, control of the exhaust phaser 252 continues at 508.

At 506, the position control module 308 adjusts one or both the intake and exhaust phasers 250, 252 to the respective new optimal intake and exhaust phaser positions, ICPP2 and ECPP2, based on the determination at 506. At 508, the start-stop module 280 starts the ICE 202. From 508, control of the ICE 202 may continue according to another method for controlling engine operation as indicated by reference numeral 510.

With particular reference to FIG. 6, control may continue at 600 from 424 as indicated by reference numeral 426. At 600, the start-stop module 280 determines whether to start the ICE 202 based on the driver-initiated starting criteria. If yes, then control proceeds at 602, otherwise, control loops back as shown. At 602, the position determination module 306 determines the new optimal intake and exhaust phaser positions, ICPP2 and ECPP2, based on the current engine operating conditions. At 604, the position control module 308 determines a first difference between ICPP1 and ICPP2 and a second difference between ECPP1 and ECPP2. The position control module 308 then determines whether the first difference is greater than a first predetermined difference. If yes, then control of the intake phaser 250 continues at 606, otherwise, control of the intake phaser 250 continues at 608. The position control module 308 further determines whether the second difference is greater than a second predetermined difference. If yes, then control of the exhaust phaser 252 continues at 606, otherwise, control of the exhaust phaser 252 continues at 608.

At 606, the position control module 308 adjusts one or both the intake and exhaust phasers 250, 252 to the respective new optimal intake and exhaust phaser positions, ICPP2 and ECPP2, based on the determination at 606. At 608, the start-stop module 280 starts the ICE 202. From 608, control of the ICE 202 may continue according to another method for controlling engine operation as indicated by reference numeral 610.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
a position determination module that determines a first cam phaser position for starting said engine prior to engine shut down, and that determines a second cam phaser position for starting said engine while said engine is shut down; and
a position control module that adjusts a cam phaser to said first cam phaser position at engine shut down, and that adjusts said cam phaser from said first cam phaser position to said second cam phaser at engine start up when a difference between said first cam phaser position and said second cam phaser position is greater than a predetermined difference.

2. The control system of claim 1, wherein said position determination module determines said first cam phaser position based on an engine operating condition prior to engine shut down.

3. The control system of claim 2, wherein said position determination module selects one of manifold absolute pressure and ambient pressure as said operating condition based on an engine shut-down criterion.

4. The control system of claim 3, wherein said position determination module selects ambient pressure as said operating condition when said engine is shut down in response to a driver input, and selects manifold absolute pressure as said operating condition when said engine is shut down in response to an engine torque being less than a predetermined torque.

5. The control system of claim 2, wherein said position determination module selects ambient pressure as said operating condition when an ignition switch has moved from an ON position to an OFF position.

6. The control system of claim 1, wherein said position determination module determines said first cam phaser position based on at least one of an engine temperature, a manifold absolute pressure, and an ambient pressure prior to engine shut down.

7. The control system of claim 1, wherein said first cam phaser position is a position other than a fully advanced position and a fully retarded position.

8. The control system of claim 1, wherein said position control module adjusts said cam phaser to said first cam phaser position prior to when an engine speed at engine shut down is zero.

9. The control system of claim 1, wherein said position control module adjusts said cam phaser to said second cam phaser prior to engine cranking at engine start up.

10. The control system of claim 1, wherein said cam phaser is electrically actuated.

11. A control system for an engine, comprising:
a start-stop module that shuts down said engine during a first period and subsequently starts said engine after a second period;
a position determination module that determines a first cam phaser position based on a first engine operating condition during said first period, and that determines a second cam phaser position based on a second engine operating condition during said second period; and
a position control module that adjusts a cam phaser to said first cam phaser position during said first period, and selectively adjusts said cam phaser from said first cam phaser position to said second cam phaser position based on a difference between said first and second cam phaser positions.

12. The control system of claim 11, wherein said position control module adjusts said cam phaser to said second cam phaser position when said difference is greater than a predetermined difference.

13. The control system of claim 11, wherein said position control module adjusts said cam phaser to said first cam phaser position prior to when said start-stop module shuts down said engine.

14. The control system of claim 11, wherein said position control module adjusts said cam phaser to said second cam phaser position during said second period.

15. A method for controlling an engine, comprising:
determining a first cam phaser position for starting said engine prior to engine shut down;
determining a second cam phaser position for starting said engine while said engine is shut down;
adjusting a cam phaser to said first cam phaser position at engine shut down; and
adjusting said cam phaser from said first cam phaser position to said second cam phaser at engine start up when a difference between said first cam phaser position and said second cam phaser position is greater than a predetermined difference.

16. The method of claim 15, further comprising determining said first cam phaser position based on an engine operating condition prior to engine shut down.

17. The method of claim 16, further comprising selecting one of manifold absolute pressure and ambient pressure as said operating condition based on an engine shut-down criterion.

18. The method of claim 17, further comprising:
selecting ambient pressure as said operating condition when said engine is shut down in response to a driver input; and
selecting manifold absolute pressure as said operating condition when said engine is shut down in response to an engine torque being less than a predetermined torque.

19. The method of claim 15, further comprising determining said first cam phaser position based on at least one of an engine temperature, a manifold absolute pressure, and an ambient pressure prior to engine shut down.

20. The method of claim 15, wherein said first cam phaser position is a position other than a fully advanced position and a fully retarded position.

* * * * *